United States Patent
Hwang

(10) Patent No.: US 9,870,387 B2
(45) Date of Patent: Jan. 16, 2018

(54) METHOD, SERVER AND COMPUTER-READABLE RECORDING MEDIA FOR SETTING TRANSACTIONS OF MULTIPLE DATA OBJECTS

(71) Applicant: TMAXSOFT. CO., LTD., Gyeonggi-do (KR)

(72) Inventor: Jong Yun Hwang, Gyeonggi-do (KR)

(73) Assignee: TMAXSOFT. CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/140,714

(22) Filed: Apr. 28, 2016

(65) Prior Publication Data

US 2017/0249352 A1 Aug. 31, 2017

(30) Foreign Application Priority Data

Feb. 26, 2016 (KR) .......................... 10-2016-0023526

(51) Int. Cl.
*G06F 7/00* (2006.01)
*G06F 17/00* (2006.01)
*G06F 17/30* (2006.01)

(52) U.S. Cl.
CPC .. *G06F 17/30377* (2013.01); *G06F 17/30371* (2013.01); *G06F 17/30545* (2013.01); *G06F 17/30607* (2013.01)

(58) Field of Classification Search
CPC ................................ G06F 9/466; G06F 17/30
USPC ......................................................... 707/703
See application file for complete search history.

(56) References Cited

U.S. PATENT DOCUMENTS

| | | | | |
|---|---|---|---|---|
| 6,760,719 | B1 * | 7/2004 | Hanson | G06F 17/30445 |
| 8,661,419 | B2 * | 2/2014 | Munzenberger | G06F 9/455 |
| | | | | 717/134 |
| 2002/0023261 | A1 * | 2/2002 | Goodwin | G06F 8/10 |
| | | | | 717/146 |
| 2004/0111698 | A1 * | 6/2004 | Soong | G06F 9/466 |
| | | | | 717/102 |
| 2004/0123293 | A1 * | 6/2004 | Johnson | G06F 9/466 |
| | | | | 718/101 |
| 2005/0066155 | A1 * | 3/2005 | Dutt | G06F 17/30094 |
| | | | | 713/1 |
| 2005/0172303 | A1 * | 8/2005 | Kudo | G06F 9/505 |
| | | | | 719/316 |
| 2005/0182795 | A1 * | 8/2005 | Murthy | G06F 17/30575 |
| 2006/0036569 | A1 * | 2/2006 | Kim | G06F 9/4443 |
| 2006/0236310 | A1 * | 10/2006 | Domeika | G06F 8/443 |
| | | | | 717/140 |
| 2007/0288891 | A1 * | 12/2007 | Aakolk | G06Q 10/10 |
| | | | | 717/114 |
| 2009/0063555 | A1 * | 3/2009 | Fisher | G06F 17/30595 |

(Continued)

FOREIGN PATENT DOCUMENTS

KR 10 2000-0032756 6/2000

*Primary Examiner* — Binh V Ho
(74) *Attorney, Agent, or Firm* — Husch Blackwell LLP

(57) ABSTRACT

A method for setting transactions of multiple data objects is provided. The method includes steps of: (a) a server acquiring information on multiple data objects used for a service object, and obtaining information on data sources which are set to correspond respectively to the data objects by referring to a setting file; and (b) the server determining the multiple data objects to be used by local transactions or distributed transactions by referring to the information on the data source.

13 Claims, 7 Drawing Sheets

(56) References Cited

U.S. PATENT DOCUMENTS

| | | | |
|---|---|---|---|
| 2009/0164420 A1* | 6/2009 | Srivastava | G06Q 30/0205 |
| 2009/0265301 A1* | 10/2009 | Chen | G06F 17/30286 |
| 2010/0241629 A1* | 9/2010 | Tatemura | G06F 17/30557 |
| | | | 707/741 |
| 2011/0016414 A1* | 1/2011 | Ernst | G06F 8/63 |
| | | | 715/764 |
| 2011/0313969 A1* | 12/2011 | Ramu | G06F 17/30563 |
| | | | 707/602 |
| 2012/0185827 A1* | 7/2012 | Eska | G06F 8/71 |
| | | | 717/121 |
| 2014/0032725 A1* | 1/2014 | Solovey | G06F 8/60 |
| | | | 709/221 |
| 2014/0136511 A1* | 5/2014 | Hughes | G06F 17/30498 |
| | | | 707/714 |
| 2014/0236672 A1* | 8/2014 | Yoder | G06Q 30/00 |
| | | | 705/7.29 |
| 2014/0236948 A1* | 8/2014 | Somogyi | G06F 17/30575 |
| | | | 707/737 |
| 2015/0324223 A1* | 11/2015 | Zhang | G06F 9/50 |
| | | | 718/101 |
| 2016/0239361 A1* | 8/2016 | Vlassarev | G06F 11/0727 |

\* cited by examiner

FIG. 3

```
Public class ItemDataObject{
..
 Private String dsName;// default dataSource alias (ex : "ADS")
}

Public class UserDateObject{
   Private String dsName;// default dataSource alias (ex : "BDS")
}

Public class UserItemService{

Private ItemDataObject item;
   Private UserDataObject user;

Public void buy(String name, String userName){
    item.addItem(name);
    user.addUser(userName);
   }
}
```

FIG. 4

```
Public class UserItemService{

@DataSource(txType=Local)
    Private ItemDataObject item;
    Private UserDataObject user;

Public void buy(String name, String userName){
      item.addItem(name);
      user.addUser(userName);
    }
}
```

FIG. 5

```
Public class UserItemService{

@DataSource(alias="CDS")
    Private ItemDataObject item;

@DataSource(alias="CDS")
    Private UserDataObject user;

Public void buy(String name, String userName){
        itme.addItem(name);
        user.addUser(userName);
    }
}
```

FIG. 6

```
public EmpProcessor{
 private DataSource ds1;
 ...

public void init(){
   ds1 = //jndi lookup or jdbc Connection
```

FIG. 7

```
public EmpProcessor{
  @DataSource(name="ds")
  private DataSource ds1;
}
```

METHOD, SERVER AND COMPUTER-READABLE RECORDING MEDIA FOR SETTING TRANSACTIONS OF MULTIPLE DATA OBJECTS

CROSS REFERENCE TO RELATED APPLICATION

This application claims priority to and incorporates herein by reference all disclosure in Korean Patent Application No. 10-2016-0023526 filed Feb. 26, 2016.

FIELD OF THE INVENTION

The present invention relates to a method, a server, and computer-readable media for setting transactions of multiple data objects; and more particularly, to the method, the server, and the computer-readable media for determining or supporting to determine the multiple data objects to be used by local transactions or distributed transactions by referring to information on which data sources are set to correspond respectively to the multiple data objects used for a service object.

BACKGROUND OF THE INVENTION

To develop program that uses multiple data objects, developers generally have to determine whether data sources corresponding respectively to the data objects are homogeneous or heterogeneous and be concerned about how to set transactions of the multiple data objects as a result of the determination. As such, to solve the developers' concern, a technology of managing transactions by using user codes has been used.

However, it was difficult for the developers to unify transaction management.

In addition, program development complexity has increased because the developers must prepare the program in consideration of transaction management and it also had a problem of increased error possibility of the finally developed program due to the increased development complexity.

Such problems were not solved even by Korean Patent Laid-Open Publication No. 2000-0032756 titled "A Method for Preprocessing Transactions of Real-time Database Management System."

Therefore, the inventor intends to propose a method for allowing the developers to unify management of transactions by referring information on data sources which are set to correspond respectively to multiple data objects upon development of program that uses the multiple data objects.

SUMMARY OF THE INVENTION

It is an object of the present invention to solve all the aforementioned problems.

It is another object of the present invention to automatically manage a transaction management policy by considering information on data sources in a framework.

It is still another object of the present invention to solve concern of developers about transaction management upon development of program that uses multiple date objects.

In accordance with one aspect of the present invention, there is provided a method for setting transactions of multiple data objects, including steps of: (a) a server acquiring information on multiple data objects used for a service object, and obtaining information on data sources which are set to correspond respectively to the data objects by referring to a setting file; and (b) the server determining the multiple data objects to be used by local transactions or distributed transactions by referring to the information on the data source.

In accordance with another aspect of the present invention, there is provided a server for setting transactions on multiple data objects, including: a communication part for acquiring the multiple data objects used in a service object; and a processor for (i) obtaining information on data sources, i.e., information on data sources which are set to correspond respectively to the data objects, by referring to a configuration file; and (ii) determining or allowing to determine the multiple data objects to be used by local transactions or distributed transactions by referring to the information on which data sources are set to correspond respectively to the data objects.

BRIEF DESCRIPTION OF THE DRAWINGS

The above and other objects and features of the present invention will become apparent from the following description of preferred embodiments given in conjunction with the accompanying drawings, in which:

FIG. 3 is a diagram showing that data objects are determined to be used by distributed transactions in accordance with one example embodiment of the present invention.

FIG. 4 is a diagram showing that data objects are determined to be used by local transactions in accordance with one example embodiment of the present invention.

FIG. 5 is a diagram showing that information on aliases of data sources is designated in accordance with one example embodiment of the present invention.

FIG. 6 is a diagram representing that information on data sources which are set to correspond respectively to data objects is designated on codes of the data objects in accordance with one example embodiment of the present invention.

FIG. 7 is a diagram showing that information on data sources which are set to correspond respectively to data objects on a framework is designated in accordance with one example embodiment of the present invention.

DETAILED DESCRIPTION OF THE PREFERRED EMBODIMENTS

Figure 1:
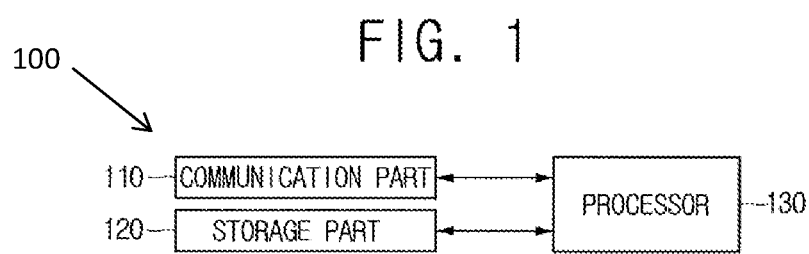
FIG. 1 is a diagram illustrating a detailed internal configuration of a server in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

FIG. 1 is a diagram illustrating a detailed internal configuration of a server in accordance with one example embodiment of the present invention.

As illustrated in FIG. 1, a server 100 in accordance with one example embodiment of the present invention may be configured by including a communication part 110, a storage part 120 and a processor 130. All of the communication part 110, the storage part 120 and the processor 130 do not have to be physically included in the server 100, and they could be placed on an external device connected with the server 100. In accordance with one example embodiment of the present invention, at least some of the communication part 110, the storage part 120 and the processor 130 may be program modules communicated with an external electronic device. Such program modules may be included in the server 100 in a form of operating system, application program module and other program module or physically stored in various storage devices well known to those skilled in the art. They may be also stored in a remote storage device capable of communicating with external electronic devices that transmit and receive data with the server 100. Such program modules may include, but not be limited to a routine, a subroutine, a program, an object, a component, and a data structure for executing a specific operation or a type of specific abstract data that will be described in accordance with the present invention.

First of all, the communication part 110 in accordance with the present invention may acquire information on multiple data objects to be used in a service object. For example, the communication part 110 could acquire information on multiple data objects to be used in a service object from an external electronic device (not illustrated) that can transmit and receive data through wireless or wired communication with the server 100, and could also acquire information on particular data objects to be used in the service object among the multiple data objects stored in the storage part 120 of the server 100 but it is not limited to these.

Data objects, as a class for accessing database where data sources belong, may be provided through a framework. In addition, the data objects may include data used and returned to Create, Read, Update or Delete (CRUD) data in database. In addition, the data objects may further include information on data sources which are set to correspond respectively to the data objects. The information on the data sources may be preset on codes corresponding to the data objects (e.g., at the time before the data objects are used in a service object) or be set on a framework provided by the server 100. Besides, the data objects may further include information on aliases designated to the data sources. Herein, information on an alias may be preset to designate a data source on a code corresponding to a data object.

Next, the storage part 120 in accordance with one example embodiment of the present invention may pre-store a setting file, which may include information on data sources corresponding respectively to multiple data objects. Herein, the information on the data sources may include information on address to access physical database where data sources belong. Besides, the setting file may include a configuration file that stores information necessary for the server 100 to perform the service object. For example, the information on the data sources included in the setting file may be pre-stored in the storage part 120 to CRUD-related data included respectively in the multiple data objects, i.e., data used and returned to CRUD data in database. In addition, the information on the data sources may be pre-stored in the setting file such that the information on the data sources corresponds to information on aliases designated to the data sources of the data objects respectively.

Next, the processor 130 in accordance with one example embodiment of the present invention may obtain the information on the data sources set to correspond respectively to the multiple data objects acquired through the communication part 110 by referring to the setting file pre-stored in the storage part 120. For example, the processor 130 may obtain the information on data sources corresponding respectively to the multiple data objects by referring to the setting file pre-stored in the storage part 120 and CRUD-related data acquired through and the communication part 110. Besides, the processor 130 may obtain the information on the data sources set to correspond respectively to the multiple data objects by referring to the setting file and information on aliases of the multiple data objects acquired through the communication part 110.

In addition, if the information on the data sources is acquired, the processor 130 may determine or support to determine the multiple data objects to be used by local transactions or distributed transactions by referring to the information on the data sources, i.e., the information on which data sources are set to correspond respectively to the data objects. For example, if the information on the data sources is determined to be homogeneous, the processor 130 may determine or support to determine the multiple data objects to be used by the local transactions and if the information on the data sources is not determined to be homogeneous, the processor 130 may determine or support to determine the multiple data objects to be used by the distributed transactions by using global transactions and XA data sources. However, if there is a data object designated to a local transaction in a code among the multiple data objects acquired through the communication part 110, the processor 130 may exclude the data object designated to the local transaction from the execution of determining which data sources are set to correspond respectively to the data objects. To determine which data sources are set to correspond respectively to the data objects may mean to determine whether the data sources belong to a single physical database or two or more different physical databases.

Additionally, the processor 130 may execute or support to execute a service object corresponding to a service query by injecting the multiple data objects determined to be used by the local transactions or the distributed transactions depending on information on which data sources are set to correspond respectively to the data objects.

Meanwhile, before the process of obtaining information on the data sources, the processor 130 in accordance with one example embodiment of the present invention may further perform the following processes:

The processor 130 may get a service query through the communication part 110, search a service object corresponding to the service query among the multiple service objects pre-stored in the storage part 120 by referring to the service query, and determine multiple data objects used for the searched service object. In addition, the processor 130 may analyze whether the information on the data sources exists or not by analyzing codes of the data objects acquired through the communication part 110. If there are two or more data objects with the information on the data sources, the processor 130 may perform the aforementioned processes on the two or more data objects.

Figure 2:
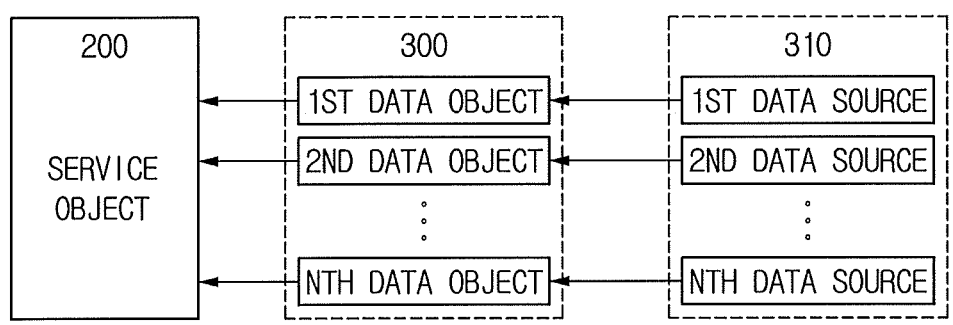
FIG. 2 is a drawing representing a service object and multiple data objects in accordance with one example embodiment of the present invention.

FIG. 2 is a drawing representing a service object and multiple data objects in accordance with one example embodiment of the present invention.

As illustrated in FIG. 2, the server 100 in accordance with one example embodiment of the present invention may manage transactions of multiple data objects 300 by referring to information on data sources 310 set to correspond respectively to the multiple data objects 300 used for a service object 200 in a unified way. If the processor 130 of the server 100 manages the transactions of the multiple data objects in the unified way, developers may increase development productivity because they don't have to directly manage the transactions.

FIG. 3 is a diagram showing that data objects are determined to be used by distributed transactions in accordance with one example embodiment of the present invention.

As illustrated in FIG. 3, the processor 130 of the server 100 in accordance with one example embodiment of the present invention may obtain information on data sources set to correspond respectively to data objects ItemDataObject and UserDataObject used for a service object UserItemService and determine or support to determine the data objects to be used by local transactions or distributed transactions by referring to the information on the data sources. The data object ItemDataObject has an alias of ADS as the information on the data source corresponding to ItemDataObject and the other data object UserDataObject has an alias of BDS as the information on the data source corresponding to UserDataObject. The processor 130 of the server 100 may determine or support to determine ItemDataObject and UserDataObject to be used by distributed transactions because information on data sources set to correspond respectively to the data objects ItemDataObject and UserDataObject is heterogeneous. The processor 130 of the server 100 may inject the data objects ItemDataObject and UserDataObject determined to be used by distributed transactions into UserItemService to allow UserItemService as a service object to use the data objects.

FIG. 4 is a diagram showing that data objects are determined to be used by local transactions in accordance with one example embodiment of the present invention.

As illustrated in FIG. 4, the processor 130 of the server 100 in accordance with one example embodiment of the present invention may obtain the data objects ItemDataObject and UserDataObject used for the service object UserItemService and if some of the data objects are designated to be used by the local transaction in a code, the processor 130 may exclude the data objects from the execution of determining which data sources are set to correspond to the data objects. The processor 130 of the server 100 may exclude the data object ItemDataObject from the execution of determining information on which data sources are set to correspond respectively to the data objects because the data object ItemDataObject is determined to be used by the local transaction in the code, i.e., @DataSource(txType=Local). The processor 130 of the server 100 may determine or support to determine another data object UserDataObject to be used by the local transaction. The service object UserItemService into which ItemDataObject and UserDataObject determined to be used by the local transaction are injected may work with the local transaction.

FIG. 5 is a diagram showing that information on aliases of data sources is designated in accordance with one example embodiment of the present invention.

As illustrated in FIG. 5, the data objects ItemDataObject and UserDataObject used for the service object UserItemService may include information on s specific alias, i.e., "CDS", as information on a particular data source as shown in @DataSource(alias="CDS"). Since the information on aliases of ItemDataObject and UserDataObject is homogenous, the processor 130 of the server 100 may determine or support to determine ItemDataObject and UserDataObject to be used by the local transaction. The service object UserItemService into which ItemDataObject and UserDataObject determined to be used by the local transaction are injected may work with the local transaction.

FIG. 6 is a diagram representing that information on data sources which are set to correspond respectively to data objects is designated on codes of the data objects in accordance with one example embodiment of the present invention.

As illustrated in FIG. 6, the information on the data sources which are set to correspond respectively to the multiple data objects may be pre-set on codes. It can be found that the information on a data source is designated as private DataSource ds1 by referring to codes corresponding to a data object EmpProcessor. The processor 130 of the server 100 may analyze whether the information on the data sources exists or not by analyzing the codes of the multiple data objects. As the information on the data source corresponding to the data object EmpProcessor is designated as private DataSource ds1 on the corresponding codes, the processor 130 may determine that the information on the data source corresponding to the data object EmpProcessor exists.

FIG. 7 is a diagram showing that information on data sources which are set to correspond respectively to data objects is designated on a framework in accordance with one example embodiment of the present invention.

As illustrated in FIG. 7, the information on the data sources may be designated on the framework. It can be found that the information on the data sources on the framework corresponding to the data object EmpProcessor is designated as @DataSource(name="ds") and private DataSource ds1. The processor 130 of the server 100 may determine whether the information on the data sources exists or not by analyzing the codes of the multiple data objects. As the information on data sources on the codes corresponding to the data object EmpProcessor is designated as @DataSource(name="ds") and private DataSource ds1, the processor 130 may determine that the information on the data source corresponding to the data object EmpProcessor exists.

In accordance with the present invention, the concern of developers about the management of transactions could be solved by automatically determining or supporting to determine transactions of multiple data objects on the basis of a certain criteria upon the development of program that uses the multiple data objects.

In accordance with the present invention, the development complexity and the probability of errors with respect to finally-developed program may be reduced by allowing a server to unify the management of the transactions of the multiple data objects.

Besides, the embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for allowing setting transactions of multiple data objects to be managed in a unified way for a developer to increase development productivity, comprising steps of:
   (a1) a server receiving a service query; and
   (a2) the server searching a service object among multiple pre-stored service objects by referring to the received service query,
   (a3) the server deciding multiple data objects used for the searched service object,
   (a4) the server analyzing whether information on aliases designated to data sources exists by analyzing codes of the data objects,
   (a) the server, if there are at least two specific data objects with the information on the aliases designated to the data sources and unless the at least two data objects are designated to be used by a local transaction, acquiring information on the at least two specific multiple data objects used for the service object, and obtaining the information on the data sources that are set to correspond respectively to the at least two specific data objects by referring to a setting file, wherein each of the at least two specific data objects is a class configured to access a database where one or more specific data sources belong, and the service object is a class including one or more references to the at least two specific data objects for handling the database, wherein the information on the data sources corresponding to the multiple data objects is set on a framework; and
   (b) the server determining the at least two specific multiple data objects to be used by local transactions by referring to the information on the aliases designated to the data sources if the information on the aliases designated to the data sources is determined to be homogenous and determining the at least two specific multiple data objects to be used by distributed transactions by referring to the information on the aliases designated to the data sources if the information on the aliases designated to the data sources is not determined to be homogeneous, wherein, before the step of (a), the server analyzes whether the information on the data sources exists by analyzing codes of the data objects, and as a result of analysis, if there are at least two data objects with the information on the data sources, the steps of (a) and (b) are performed on the at least two data objects,
   (c) injecting the at least two specific data objects determined to be used by the local transactions or the distributed transactions into the service object, to thereby allow the service object to use the at least two specific data objects.

2. The method of claim 1, wherein the multiple data objects include data used and returned to Create, Read, Update or Delete (CRUD) data in the database.

3. The method of claim 1, wherein, at the step of (b), the server determines the multiple data objects to be used by the distributed transactions by using global transactions and extended architecture ("XA") data sources.

4. The method of claim 1, wherein the information on the aliases designated respectively to the data sources is pre-stored in the setting file, and at the step of (a), the server acquires information on one or more specific aliases designated to one or more particular data sources corresponding respectively to the multiple data objects, and obtains the information on the data sources corresponding respectively to the information on the specific aliases from the setting file.

5. The method of claim 1, wherein, if there is a data object designated to a local transaction in a code among the multiple data objects, the server excludes the data object designated to the local transaction from the execution of the step (b).

6. The method of claim 1, wherein the information on the data sources corresponding to the multiple data objects is pre-set by using codes corresponding thereto.

7. The method of claim 1, wherein the setting file includes a configuration file.

8. A server for allowing setting transactions on multiple data objects to be managed in a unified way for a developer to increase development productivity, comprising:
   a communication part for receiving a service query, and acquiring the multiple data objects used in a service object; and
   a processor for
   (i) searching a service object among multiple pre-stored service objects by referring to the received service query,
   (ii) deciding multiple data objects used for the searched service object,
   (iii) analyzing whether information on aliases designated to data sources exists by analyzing codes of the data objects,
   (iv) if there are at least two specific data objects with the information on the aliases designated to the data sources and unless the at least two data objects are designated to be used by a local transaction, obtaining the information on the data sources that are set to correspond respectively to the at least two specific data objects by referring to a configuration file, wherein each of the at least two specific data objects is a class configured to access a database where one or more specific data sources belong, and the service object is a class including one or more references to the at least two specific data objects for handling the database, wherein the information on the data sources corresponding to the multiple data objects is set on a framework; and (v) determining or allowing to determine the at least two specific multiple data objects to be used by local transactions by referring to the information on the aliases designated to data sources if the information on the data source is determined to be homogenous and determine the at least two specific multiple data objects to be used by distributed transactions by referring to the information on the aliases designated to data sources if the information on the data source is not determined to be homogeneous, wherein, before the execution of (iv), the processor analyzes whether the information on the data sources exists or not by analyzing codes of the data objects, and as a result of analysis, if there are at least two data objects with the information on the data sources, (iv) and (v) are performed on the at least two data objects, wherein, after the execution of (v), the processor injects the multiple data objects determined to be used by the local transactions or the distributed transactions into the service object.

9. The server of claim 8, wherein the multiple data objects include data used and returned to Create, Read, Update or Delete (CRUD) data in the database.

10. The server of claim 8, wherein the processor determines or supports to determine the multiple data objects to be used by the distributed transactions by using global transactions and extended architecture ("XA") data sources.

11. The server of claim 8, wherein the information on the aliases designated to the individual data sources is pre-stored in the setting file and the processor acquires information on one or more specific aliases designated to one or more particular data sources corresponding respectively to the multiple data objects, and obtains the information on the data sources corresponding respectively to the information on the specific aliases from the setting file.

12. The server of claim 8, wherein the information on the data sources corresponding to the multiple data objects is pre-set by using codes corresponding thereto.

13. The server of claim 8, wherein the setting file includes a configuration file.

* * * * *